United States Patent
Choi et al.

(10) Patent No.: US 11,503,323 B2
(45) Date of Patent: Nov. 15, 2022

(54) METHOD AND APPARATUS FOR INTER-PICTURE PREDICTION WITH VIRTUAL REFERENCE PICTURE FOR VIDEO CODING

(71) Applicant: TENCENT AMERICA LLC, Palo Alto, CA (US)

(72) Inventors: Byeongdoo Choi, Palo Alto, CA (US); Zeqiang Li, Palo Alto, CA (US); Wei Wang, San Jose, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/329,751

(22) Filed: May 25, 2021

(65) Prior Publication Data

US 2022/0094962 A1 Mar. 24, 2022

Related U.S. Application Data

(60) Provisional application No. 63/083,527, filed on Sep. 25, 2020, provisional application No. 63/082,784, filed on Sep. 24, 2020.

(51) Int. Cl.
*H04N 19/503* (2014.01)
*H04N 19/109* (2014.01)
(Continued)

(52) U.S. Cl.
CPC ........ *H04N 19/503* (2014.11); *H04N 19/109* (2014.11); *H04N 19/136* (2014.11); *H04N 19/172* (2014.11)

(58) Field of Classification Search
None
See application file for complete search history.

(56) References Cited

U.S. PATENT DOCUMENTS 10,958,869 B1 * 3/2021 Chi ...................... G06N 3/0454
2014/0105286 A1 4/2014 Caglar et al.
(Continued)

OTHER PUBLICATIONS

Benjamin Bross, et al., "Versatile Video Coding (Draft 10)", JVET-S2001-vD, Joint Video Experts Team (JVET) of ITU-T SG 16 WP 3 and ISO/IEC JTC 1/SC 29/WG 11, 19th Meeting: by teleconference, Jun. 22-Jul. 1, 2020, 551 pages.
(Continued)

*Primary Examiner* — Samuel D Fereja
(74) *Attorney, Agent, or Firm* — Sughrue Mion, PLLC

(57) ABSTRACT

A method of performing inter-picture prediction of a current picture of a video sequence is performed by at least one processor and includes determining whether the current picture uses a virtual reference picture, and based on the current picture being determined to use the virtual reference picture, generating, for the current picture, the virtual reference picture from neighboring reference pictures that are nearest neighbors to the virtual reference picture, storing the generated virtual reference picture in a decoded picture buffer, and adding the generated virtual reference picture to an active reference picture list. The method further includes performing the inter-picture prediction of the current picture, based on the active reference picture list to which the virtual reference picture is added.

20 Claims, 11 Drawing Sheets

(51) Int. Cl.
*H04N 19/136* (2014.01)
*H04N 19/172* (2014.01)

(56) References Cited

U.S. PATENT DOCUMENTS

2016/0165237 A1 6/2016 Chen et al.
2019/0306526 A1* 10/2019 Cho ...................... G06N 20/00

OTHER PUBLICATIONS

International Search Report dated Sep. 15, 2021 from the International Searching Authority in International Application No. PCT/US2021/037395.
Written Opinion dated Sep. 15, 2021 from the International Searching Authority in International Application No. PCT/US2021/037395.

* cited by examiner

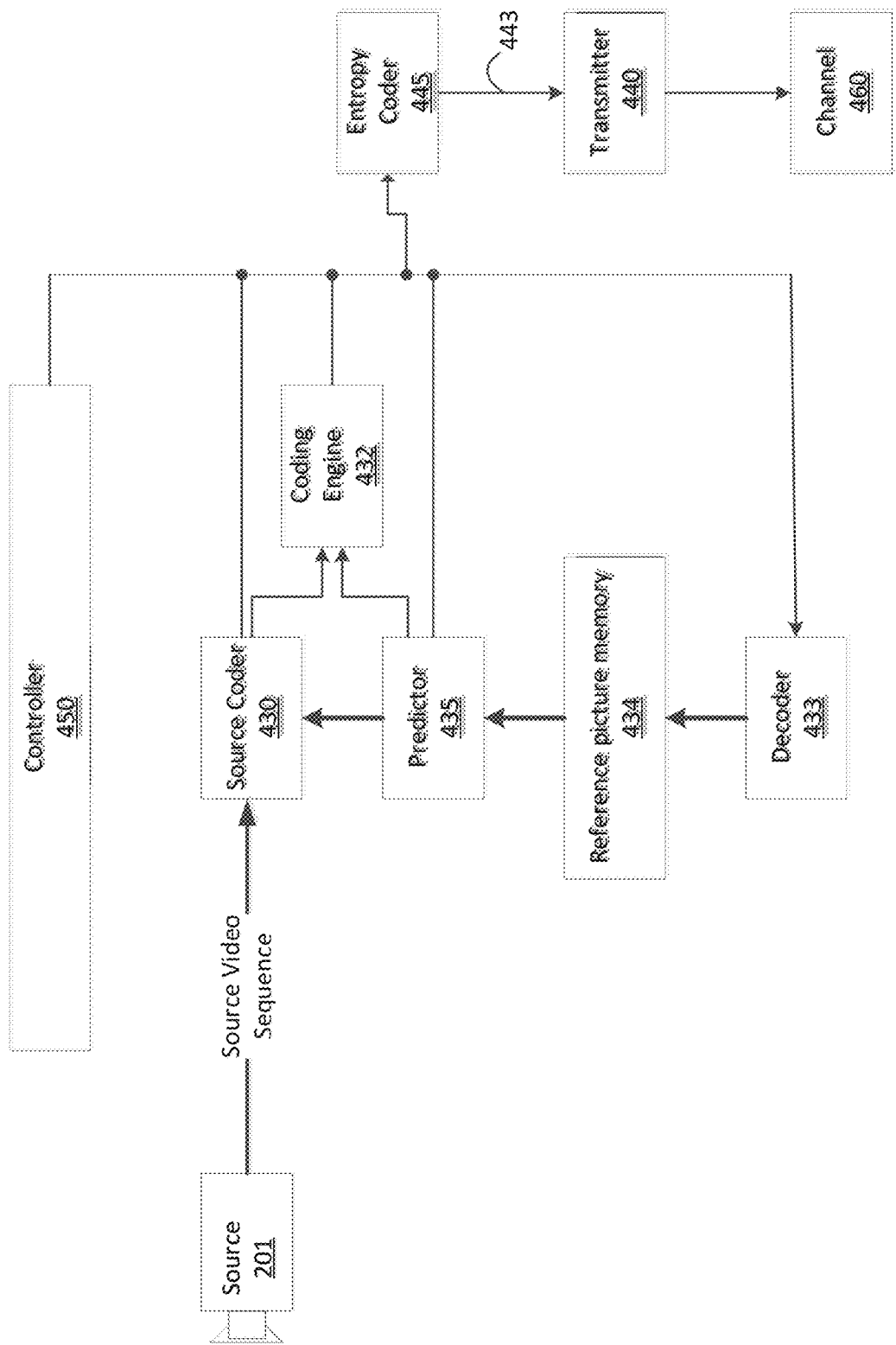
FIG. 4   Encoder 203

Computer System 700

METHOD AND APPARATUS FOR INTER-PICTURE PREDICTION WITH VIRTUAL REFERENCE PICTURE FOR VIDEO CODING

CROSS-REFERENCE TO RELATED APPLICATIONS

This application claims priority from U.S. Provisional Patent Application No. 63/082,784, filed on Sep. 24, 2020, and U.S. Provisional Patent Application No. 63/083,527, filed on Sep. 25, 2020, in the U.S. Patent and Trademark Office, which are incorporated by reference herein in their entireties.

FIELD

Methods and apparatuses consistent with embodiments relate to video coding, and more particularly, a method and an apparatus for inter-picture prediction with a virtual reference picture for video coding.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques in which an exact copy of the original signal can be reconstructed from the compressed original signal. When using lossy compression, the reconstructed signal may not be identical to the original signal, but the distortion between original and reconstructed signal may be small enough to make the reconstructed signal useful for the intended application. In the case of video, lossy compression is widely employed. The amount of distortion tolerated depends on the application; for example, users of consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

SUMMARY

According to embodiments, a method of performing inter-picture prediction of a current picture of a video sequence is performed by at least one processor and includes determining whether the current picture uses a virtual reference picture, and based on the current picture being determined to use the virtual reference picture, generating, for the current picture, the virtual reference picture from neighboring reference pictures that are nearest neighbors to the virtual reference picture, storing the generated virtual reference picture in a decoded picture buffer, and adding the generated virtual reference picture to an active reference picture list. The method further includes performing the inter-picture prediction of the current picture, based on the active reference picture list to which the virtual reference picture is added.

According to embodiments, an apparatus for performing inter-picture prediction of a current picture of a video sequence includes at least one memory configured to store computer program code, and at least one processor configured to access the at least one memory and operate according to the computer program code. The computer program code includes first determining code configured to cause the at least one processor to determining whether the current picture uses a virtual reference picture, generating code configured to cause the at least one processor to, based on the current picture being determined to use the virtual reference picture, generate, for the current picture, the virtual reference picture from neighboring reference pictures that are nearest neighbors to the virtual reference picture, storing code configured to cause the at least one processor to store the generated virtual reference picture in a decoded picture buffer, adding code configured to cause the at least one processor to add the generated virtual reference picture to an active reference picture list, and performing code configured to cause the at least one processor to perform the inter-picture prediction of the current picture, based on the active reference picture list to which the virtual reference picture is added.

According to embodiments, a non-transitory computer-readable storage medium storing instructions that, when executed by at least one processor for performing inter-picture prediction of a current picture of a video sequence, cause the at least one processor to determine whether the current picture uses a virtual reference picture, and based on the current picture being determined to use the virtual reference picture, generate, for the current picture, the virtual reference picture from neighboring reference pictures that are nearest neighbors to the virtual reference picture, store the generated virtual reference picture in a decoded picture buffer, and add the generated virtual reference picture to an active reference picture list. The instructions, when executed by the at least one processor, further cause the at least one processor to perform the inter-picture prediction of the current picture, based on the active reference picture list to which the virtual reference picture is added.

BRIEF DESCRIPTION OF THE DRAWINGS

FIG. 4 is a schematic illustration of a simplified block diagram of an encoder in accordance with an embodiment.

DETAILED DESCRIPTION

When raw video data are compressed, inter-/intra-correlation are utilized to reduce the redundant data in the coded bitstream. Especially, inter-picture prediction techniques have been widely used to remove the inter-picture redundancy, with motion estimation and compensation. By compensating motions of object and background, more accurate prediction can reduce the entropy of the residual data. Utilizing more forward or backward reference picture have provided more efficient compression in various video coding frameworks and standards. However, although many efficient algorithm with motion compensation improved the coding efficiency, still residual data after inter-prediction usually remained and increase the coded bit size. In this disclosure, to reduce the residual data and improve the coding efficiency, more accurate reference pictures are generated from other decoded reference pictures. By helps of the outstanding algorithm or neural-network processing, the generated reference pictures can bring more accurate prediction for video compression.

Figure 1:
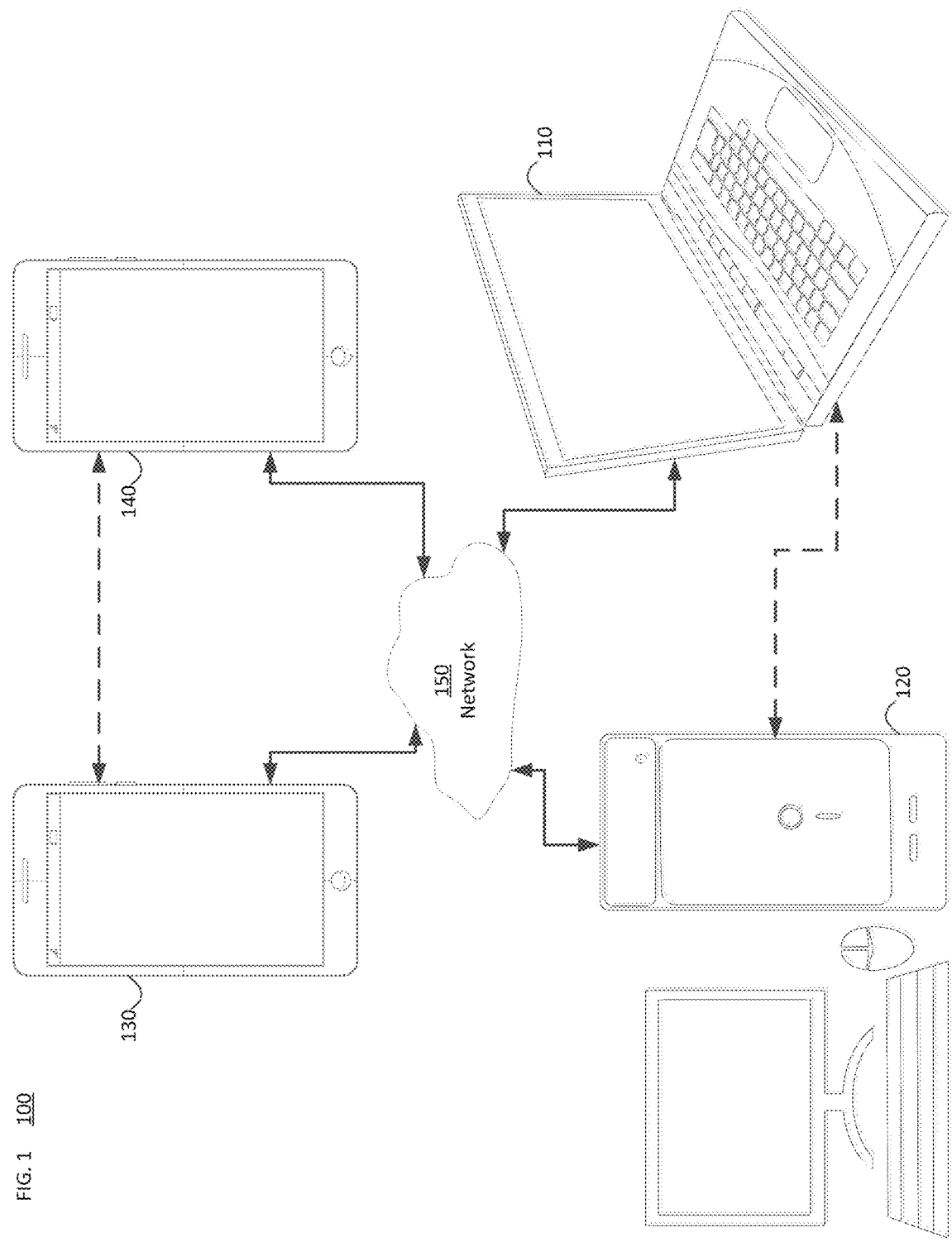
FIG. 1 is a schematic illustration of a simplified block diagram of a communication system in accordance with an embodiment.

FIG. 1 is a schematic illustration of a simplified block diagram of a communication system (100) in accordance with an embodiment.

The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be performed in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the disclosure may be not so limited. Embodiments of the disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the disclosure unless explained herein below.

Figure 2:
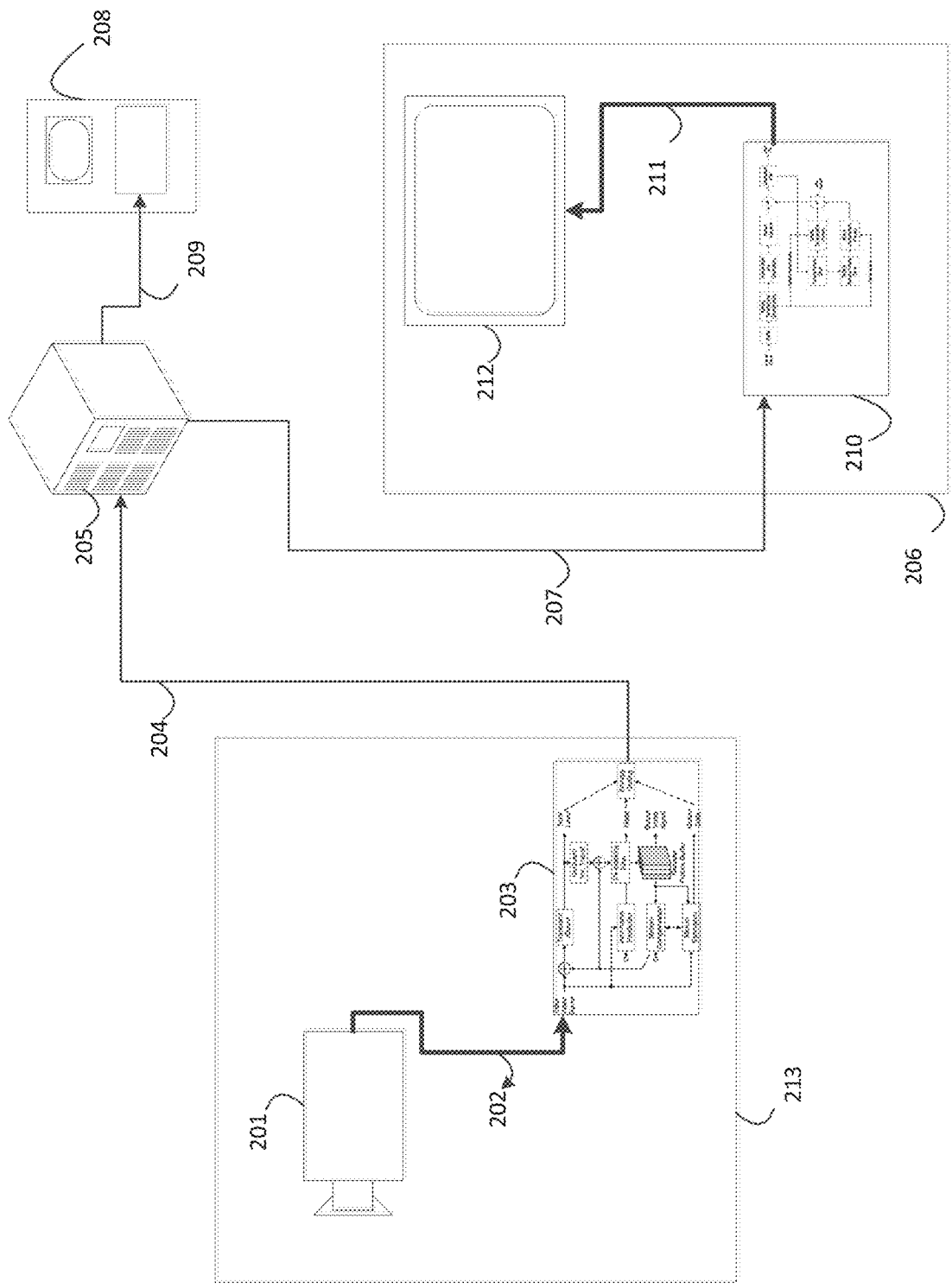
FIG. 2 is a schematic illustration of a simplified block diagram of a streaming system in accordance with an embodiment.

FIG. 2 is a schematic illustration of a simplified block diagram of a streaming system (200) in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) that decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to video coding/compression standards. Under development is a video coding standard informally known as Versatile Video Coding or VVC. The disclosed subject matter may be used in the context of VVC.

Figure 3:
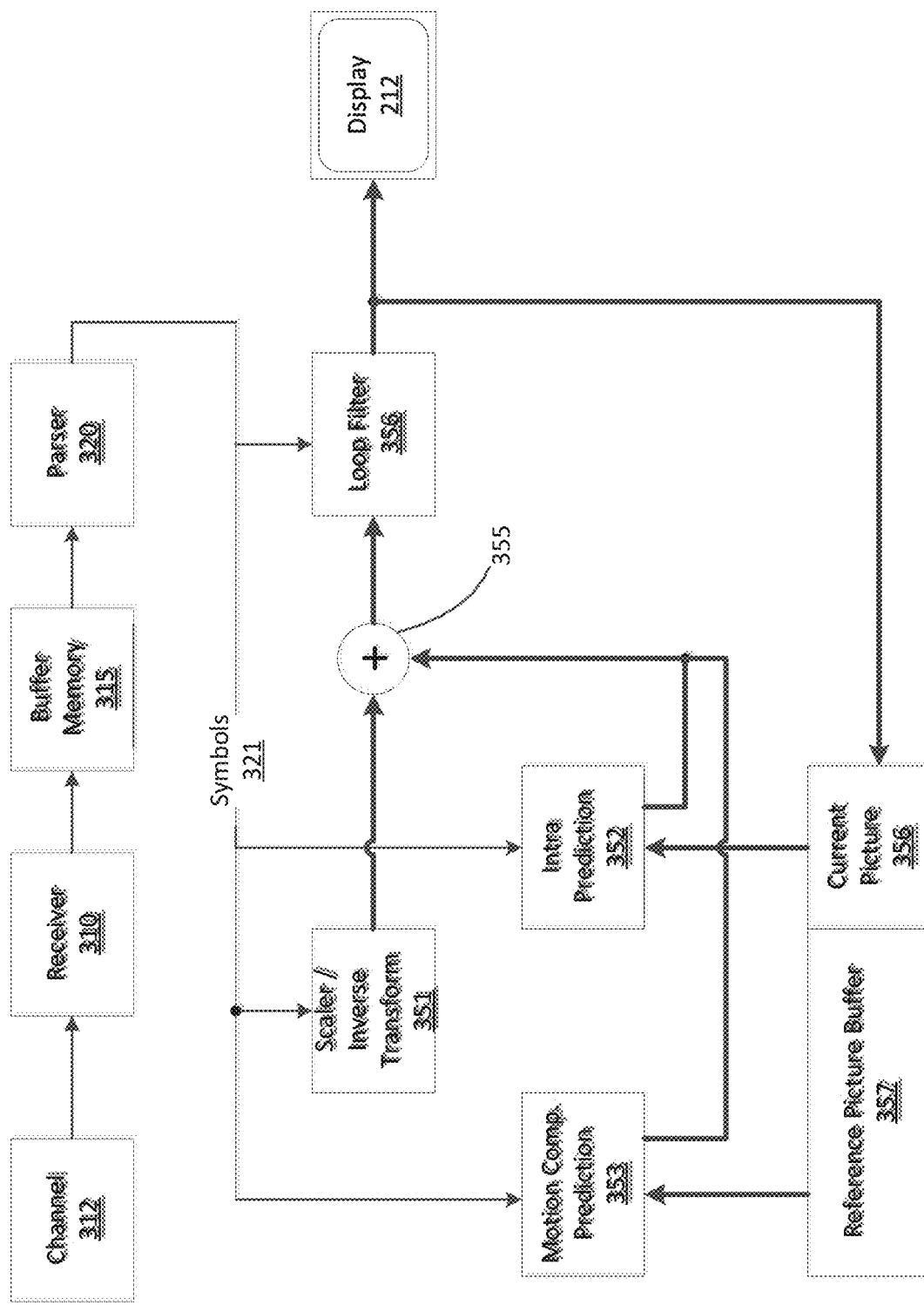
FIG. 3 is a schematic illustration of a simplified block diagram of a decoder in accordance with an embodiment.

FIG. 3 is a schematic illustration of a simplified block diagram of a decoder (210) in accordance with an embodiment.

A receiver (310) may receive one or more codec video sequences to be decoded by the decoder (210); in the same or another embodiment, one coded video sequence at a time, in which the decoding of each coded video sequence is independent from other coded video sequences. The coded video sequence may be received from a channel (312), which may be a hardware/software link to a storage device that stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include an parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 2. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for any one or any combination of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks including sample values, that can be input into aggregator (355).

In some cases, the output samples of the scaler/inverse transform unit (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra picture prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (358). Video compression technologies can include in-loop filter technologies that are controlled by parameters included in the coded video bitstream and made available to the loop filter unit (358) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (358) can be a sample stream that can be output to the render device (212) as well as stored in the reference picture memory (357) for use in future inter-picture prediction.

Coded pictures, once fully reconstructed, can be used as reference pictures for future prediction. Once a coded picture is fully reconstructed and the coded picture has been identified as a reference picture (by, for example, parser (320)), the current reference picture (356) can become part of the reference picture buffer (357), and a fresh current picture memory can be reallocated before commencing the reconstruction of the following coded picture.

The video decoder 320 may perform decoding operations according to a predetermined video compression technology that may be documented in a standard. The coded video sequence may conform to a syntax specified by the video compression technology or standard being used, in the sense that it adheres to the syntax of the video compression technology or standard, as specified in the video compression technology document or standard and in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

FIG. 4 is a schematic illustration of a simplified block diagram of an encoder (203) in accordance with an embodiment.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (201) may be a camera that captures local image information as a video sequence. Video data may be provided as a plurality of individual pictures that impart motion when viewed in sequence. The pictures themselves may be organized as a spatial array of pixels, in which each pixel can include one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 3, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also may necessarily need to be present, in substantially identical functional form, in a corresponding encoder. For this reason, the disclosed subject matter focusses on decoder operation. The description of encoder technologies can be abbreviated as they are the inverse of the comprehensively described decoder technologies. Only in areas a more detail description may be required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder, the reconstructed video sequence may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device that would store the encoded video data. The transmitter (440) may merge coded video data from the video coder (430) with other data to be transmitted, for example, coded audio data and/or ancillary data streams.

The controller (450) may manage operation of the encoder (203). During coding, the controller (450) may assign to each coded picture a coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

Figure 8:
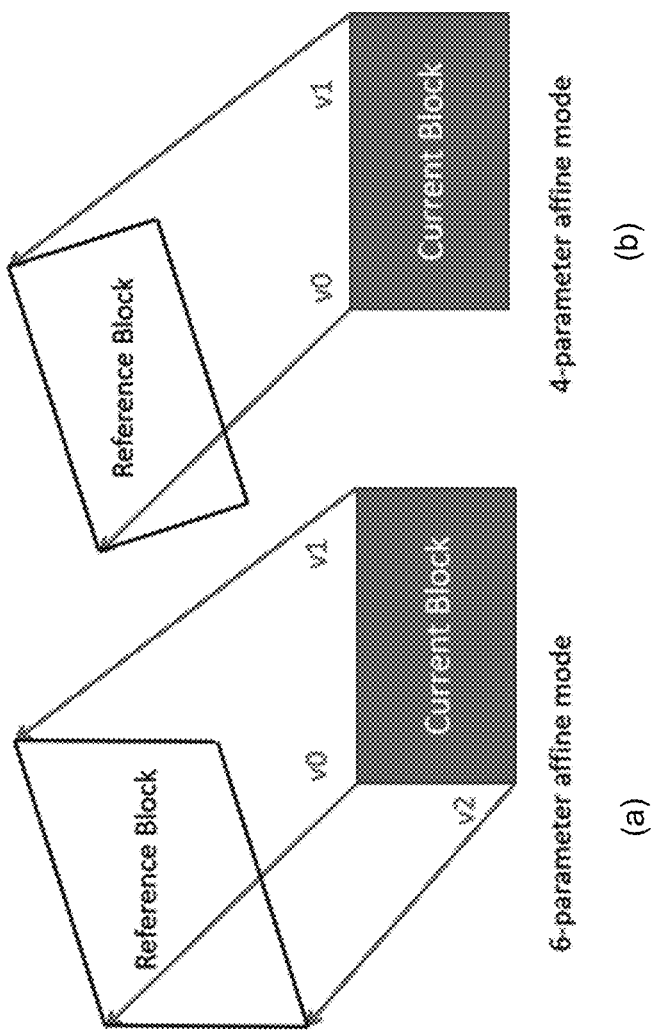
FIG. 8 is a schematic illustration of an affine prediction mode in accordance with an embodiment.

Traditional affine motion model consists of 6 parameters. For each pixel at location (x, y) with the given affine mode, its motion vector (MV) (vx, vy) can be linearly interpolated by the three corner control points motion vectors, as is shown in a portion (a) of FIG. 8. A simplified version of affine mode is also considered, in which only 4 parameters (or equivalent motion vectors at two control point locations) are required to describe the motions in an affine object, as is shown in a portion (b) of FIG. 8. In this case, the motion vector at location (x, y) can be expressed by using the motion vectors at top left and top right corners, as is in formula (1). According to this formulation, the motion vector of each pixel inside the current block will be calculated as a weighted average of the two (or three, in case of 6-parameter) corner control points' motion vectors. In VVC standard, a CU level flag is used to switch between 4-parameter affine mode and 6-parameter affine mode.

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Although each sample in an affine coded block may derive its own motion vector using the above formula, actually the affine motion compensation in VVC standard operates in a subblock basis to reduce the complexity in implementation. That is, each 4×4 luma region in the current coding unit will be considered as a whole unit (using the center location of this subblock as the representative location) to derive its subblock motion vector. To improve the precision of affine motion compensation, ⅟₁₆-pel luma MV resolution and ⅟₃₂-chroma MV resolution are used. For an affine coded block, its control point motion vectors (CPMVs) can be predicted by derivation from a neighboring affine coded block. Assuming the neighboring block and the current block are in the same affine object, the current block's CPMVs can be derived using the neighboring block's CPMV plus the distance between them. This prediction is referred as derived affine prediction. The CPMVs of an affine coded block can also be predicted by the MVs from each corner's spatial neighboring coded blocks. This prediction is referred as constructed affine prediction. After the prediction, for each CPMV of the current block, the prediction differences are subject to entropy coding, in the same way of regular inter motion vector direction (MVD) coding. In affine case, for each prediction list, up to 3 MV differences per reference list will be coded. Affine mode with signaled MV difference and affine merge mode using candidates from both derived prediction are both supported.

Figure 9:
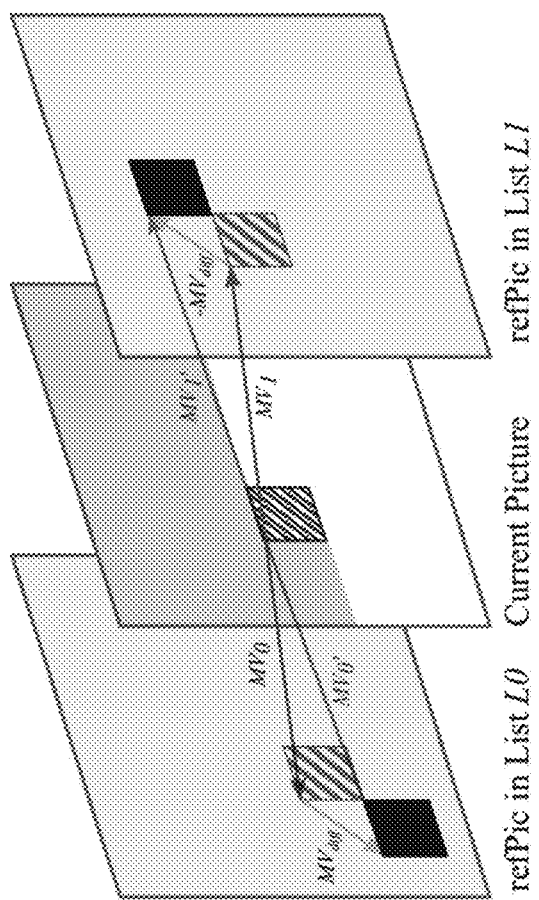
FIG. 9 is a schematic illustration of decoder-side motion vector refinement in accordance with an embodiment.

To increase the accuracy of the MVs of the merge mode, a bilateral-matching (BM) based decoder side motion vector refinement is applied in current draft of VVC software. In bi-prediction operation, a refined MV is searched around the initial MVs in the reference picture list L0 and reference picture list L1. The BM method calculates the distortion between the two candidate blocks in the reference picture list L0 and list L1. As illustrated in FIG. 9, the sum of absolute difference (SAD) between the black blocks based on each MV candidate around the initial MV is calculated. The MV candidate with the lowest SAD becomes the refined MV and used to generate the bi-predicted signal. The refined MV derived by a decoder-side motion vector refinement (DMVR) process is used to generate the inter prediction samples and also used in temporal motion vector prediction for future pictures coding. While the original MV is used in deblocking process and also used in spatial motion vector prediction for future CU coding.

The video encoder (203) may perform coding operations according to a predetermined video coding technology or standard, such as ITU-T Rec. H.265. In its operation, the video encoder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may include temporal/spatial/SNR enhancement layers, other forms of redundant data such as redundant pictures and slices, Supplementary Enhancement Information (SEI) messages, Visual Usability Information (VUI) parameter set fragments, and so on.

Before describing aspects of the disclosed subject matter in more detail, a few terms need to be introduced that will be referred to in the remainder of this description.

Sub-Picture henceforth refers to an, in some cases, rectangular arrangement of samples, blocks, macroblocks, coding units, or similar entities that are semantically grouped, and that may be independently coded in changed resolution. One or more sub-pictures may for a picture. One or more coded sub-pictures may form a coded picture. One or more sub-pictures may be assembled into a picture, and one or more sub pictures may be extracted from a picture. In environments, one or more coded sub-pictures may be assembled in the compressed domain without transcoding to the sample level into a coded picture, and in the same or other cases, one or more coded sub-pictures may be extracted from a coded picture in the compressed domain.

In VVC or other video coding frameworks or standards, the decoded pictures may be included in the reference picture list (RPL) and may be used for motion-compensated prediction as a reference picture and other parameter prediction for coding the following picture(s) in the encoding or decoding order, or may be used for intra-prediction or intra block copy for coding different region or block of the current picture.

In an embodiment, one or more virtual references may be generated and included in the RPL in both encoder and decoder, or only in decoder. The virtual reference picture may be generated by one or more processes including signal-processing, spatial or temporal filtering, scaling, weighted averaging, up-/down-sampling, pooling, recursive processing with memory, linear system processing, non-linear system processing, neural-network processing, deep-learning based processing, AI-processing, pre-trained network processing, machine-learning based processing, on-line training network processing, computer-vision based processing or their combinations. For the processing to generate the virtual reference(s), zero or more forward reference pictures, which precede the current picture in both output/display order and en-/decoding order, and zero or more backward reference pictures, which follow the current picture both in output/display order, but precede the current picture in en-/decoding order are used as input data. The output of the processing is the virtual/generated picture to be used as a new reference picture.

Figure 5A:
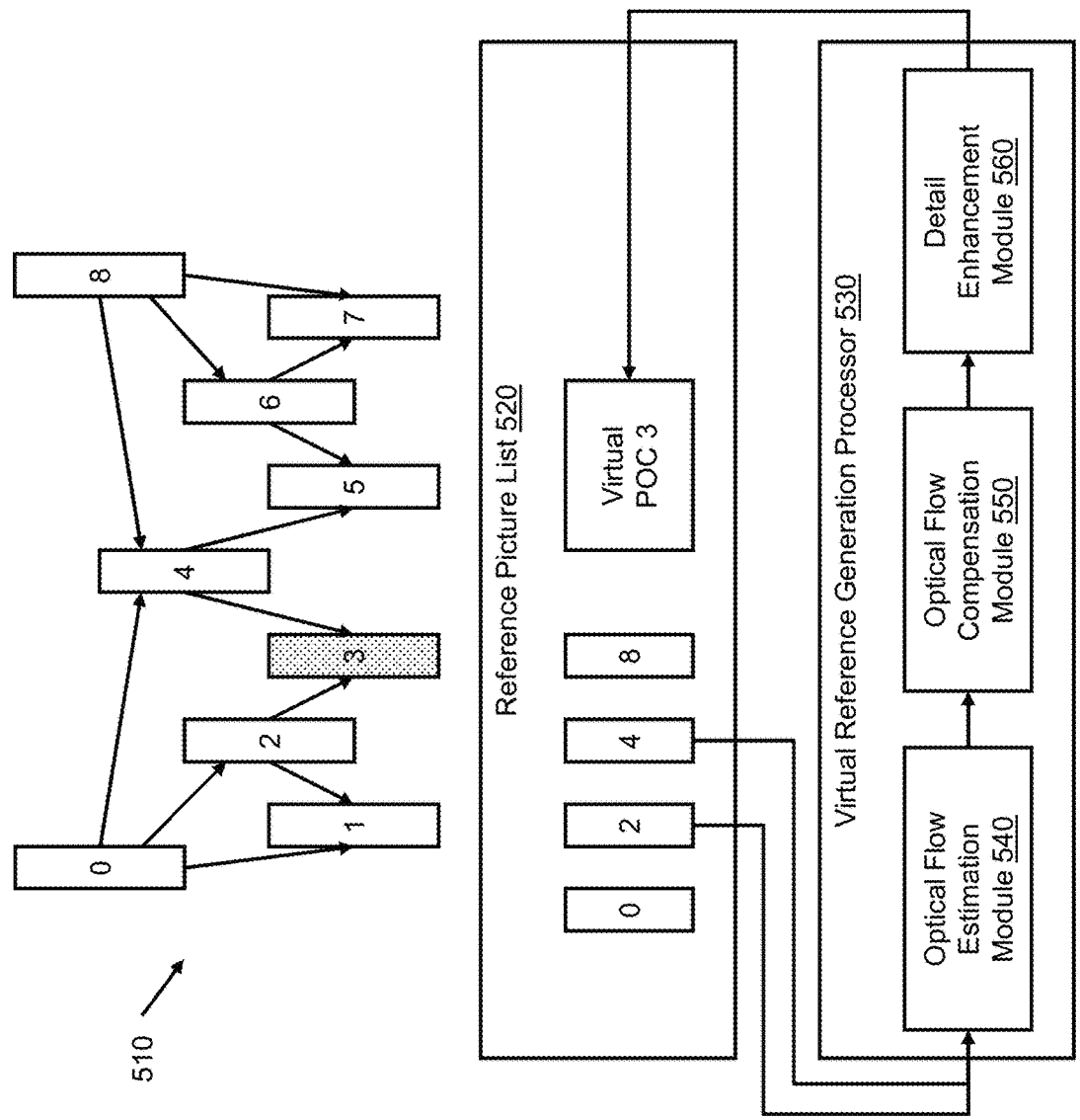
FIG. 5A is a schematic illustration of virtual reference picture generation and insertion into a reference picture list in accordance with an embodiment.

FIG. 5A is a schematic illustration of virtual reference picture generation and insertion into a reference picture list in accordance with an embodiment.

In the same embodiment, FIG. 5A illustrates an example of virtual reference picture generation and insertion into reference picture list. Given a hierarchical GOP structure 510 in FIG. 5A, when the current picture has a picture order count (POC) equal to 3, usually the decoded picture with POC equal to 0, 2, 4 or 8 may be stored in a decoded picture buffer and some of them are included in a reference picture list 520 for decoding the current picture (POC 3). As an example, the nearest decoded pictures with POC equal to 2 or 4 may be fed into a virtual reference generation processor 530 as input data. The virtual reference picture may be generated through one or multiple processes. The generated virtual reference picture may be stored in the decoded picture buffer and included into the reference picture list 520 of the current picture or one or more future pictures in decoding order. If the virtual reference picture is included into the reference picture list 520 of the current picture, the generated pixel data of the virtual reference picture may be used for motion compensated prediction as reference data, when it is indicated by a reference index that the virtual reference picture is used.

In the same or another embodiment, the entire virtual reference generation process may include of one of more signaling processing modules with one or more pre-trained neural network model or any pre-defined parameters. For example, the entire virtual reference generation process may be composed of an optical flow estimation module 540, an optical flow compensation module 550 of the virtual reference data, and a detail enhancement module 560, as shown in FIG. 5A.

In another example, the entire virtual reference generation process may be composed of feature flow estimation, coarse intermediate frame synthesizing and detail enhancement process.

In an embodiment, the virtual reference generation process may consist of one or more neural network(s).

Figure 5B:
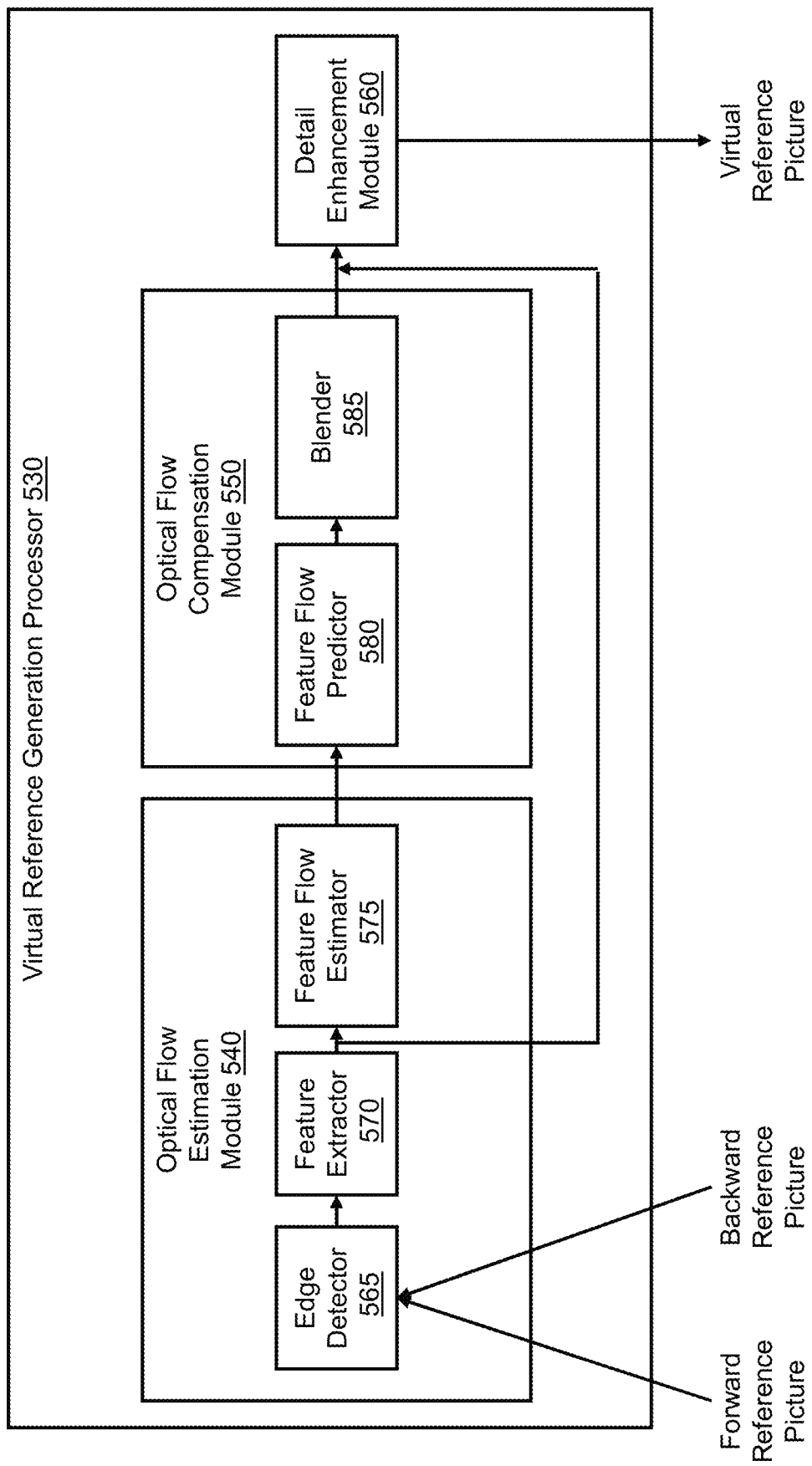
FIG. 5B is a schematic illustration of a virtual reference picture generation process in accordance with an embodiment.

FIG. 5B is a schematic illustration of a virtual reference picture generation process in accordance with an embodiment.

FIG. 5B illustrates an example of the virtual reference generation process, which consists of three sub-processes; feature flow estimation, coarse intermediate frame synthesizing, and detail enhancement process. By default, one or more forward reference pictures and one or more backward reference pictures are input, while one output picture is used as a generated virtual reference picture for video coding. Optionally, by encoder configuration or adjacent context (e.g., GOP structure), two or more forward reference pictures are used as input data, or two or more backward reference pictures are used as input data.

In the same embodiment, as shown in the example in FIG. 5B, the optical flow estimation module 540 includes an edge detector 565, a feature extractor 570, and a feature flow estimator 575 with edge map and feature maps for each reference frame. For example, when reference data are fed into the feature flow estimator 575, the edges of reference pictures are detected with a pre-trained edge detecting neural network or pre-defined algorithm. The edge maps are concatenated as the 4th channel to reinforce structural information of the dynamic scene. Once the edges, boundaries or features are obtained, one or more feature/flow maps will be calculated to be fed a feature flow predictor 580. The output of optical flow estimation process are two or more deep feature maps.

In the same embodiment, as shown in FIG. 5B, the process of coarse intermediate frame synthesizing is composed of warping process with offset compensation and blending with weighted features. The optical flow compensation module 550 includes the feature flow predictor 580 and a blender 585. With two or more reference pictures with their corresponding edge maps as input, the feature flow predictor 580 generates an offset map for deformable convolution to produce warped features. Each pixel or feature is spatially shifted with the obtained offset maps. Because sometimes one or more flow offsets connect 1-to-N pixels from the reference features to the intermediate virtual reference feature, hole filling (e.g., inpainting) in the generated virtual reference picture may be applied. Multi-attention predictor is also applied for features to get weight map for wrapped features. If two or more intermediate virtual reference pictures are generated from multiple input reference pictures, the blender 585 blends or synthesizes those intermediate frames into one virtual reference picture, with weighted average or combination. Once the coarse intermediate frame is synthesized, all three frames will be fed into the detail enhancement module 560 to improve intermediate frame quality with more a fusion of temporal spatial information.

In the same embodiment, the weights of blending for each intermediate reference picture may be calculated by multiple techniques. One example is that the weight value is calculated in relation to temporal distance (obtained by POC values) between the current picture and the decoded reference picture that is an input of the virtual reference picture generation module. Another example is that the weight value is (locally) calculated based on the image quality of each pixel, region or picture. Any measurement metric may be used for determining which regions have good or bad quality for generating the reference picture. In another example, the weights may be obtained as outputs of inference process of one or more pre-trained neural network, considering attention.

In the same or another embodiment, one or multiple convolutional network models may be used. An example is deformable convolutional network model, which may have offset values for each feature pixels. Allowing more flexible translational movement locally, the deformable convolutional network model may estimate and compensate offset flow. Another example is separable convolutional network model, which may represent spatially-adaptive horizontal or vertical motion, efficiently. The combination of multiple network models may improve the performance of network inference.

In the same or another embodiment, the coded motion vector in the bitstream may be used for pre-estimation of optical flow. Hence, the coded motion vector may be used as initial values of the optical flow with coarse resolution, and any neural network inference process may improve the resolution and accuracy of the optical flow. To enable parsing and decoding motion vectors earlier than other parameters or coded coefficients, motion vector or motion vector delta values with motion vector prediction indicators may be coded at the early position of each coded picture (e.g., picture header, slice header or first slice of the picture).

In the same or another embodiment, any decoder-side motion vector or optical flow estimator (e.g., DMVR) may be used to estimate the initial value of the optical flow. Two or more decoder-side motion vector estimators and neural network inference processes may be combined or harmonized to find the optical value of optical flow.

In the same or another embodiment, when a virtual reference picture is generated through the optical flow estimation and compensation processes, the image quality of the virtual reference picture may be enhanced with a post-processing, utilizing two or more input reference picture and their pre-obtained edge and feature data. Usually, the generated reference picture through the optical flow estimation and compensation may be blurred because two or more pictures are blended with smoothing process. One or more pre-trained or pre-defined edge enhancement, restoration, deblurring, denoising, deblocking, compression noise reduction, wiener filtering, super-resolution reconstruction, sharpening, color restoration or enhancement, subjective quality enhancement.

In the same embodiment, each shallow edge or features obtained from each (input) decoded reference picture may be spatially compensated or shifted with pre-trained network modules and blended again with the generated virtual reference picture to enhance the details.

In the same or another embodiment, the processing to generate the virtual reference picture may be processed in frame-wise, square or non-square local region (e.g., tile, tile group or subpicture) or small block-wise (e.g., coding unit or coding tree unit). Whether to process the generation of the virtual reference data in frame-wise or region/block-wise may be determined by encoder-choice, user's input data, pre-trained network or any decision algorithm, at encoder side.

In the same embodiment, one or more syntax elements, indicators or flags, which indicate whether the process is applied to the whole frame or one or more regions/blocks, may be signaled in high level syntax structure (e.g., SPS, PPS, APS, SEI message or metadata box) in the coded bitstream.

In the same or another embodiment, the existing virtual reference picture may be updated in part after the completion of decoding current picture. In one example, a region or regions in the existing virtual reference picture may be replaced by a similar generation process as above but taking the decoded current picture as additional input data. It could be updated in part by a different method, such as replacing the region(s) with the collocated part(s) of the current decoded picture.

In the same embodiment, the option and parameters of partial update of existing virtual reference picture may be indicated in a high-level syntax structure, such as the picture header, PPS or slice header associated with the current decoded picture. The parameters may include the region location, size, method choice to update the virtual reference picture.

In the same or another embodiment, one or more internal variables, which indicate whether the process is applied to the whole frame or one or more regions/blocks, may be inferred from other signaled syntax elements/parameters/metadata, or coded information of neighboring sequences/frames/blocks, any pre-defined inference rule or any automatic processing including neural network processing.

In an embodiment, when one or more virtual reference pictures are included in the reference picture list, if a reference picture indicator, which is explicitly signaled for each CU or derived implicitly from previously coded context information (e.g., the reference index of a previously coded CU, such as a neighboring CU, a generated pairwise average motion information in which at least one original candidate of the two is coded using the virtual reference picture, a stored entry in a history-based motion buffer, etc.), indicates a virtual reference picture, the generated reference pixel data through aforementioned processing, may be used as prediction data for inter-mode.

In conventional video coding systems, such as in VVC, the motion parameters including motion vector, reference picture index, reference picture lists may be signaled in an explicit (AMVP) or implicit (Merge or Skip) manner. When AMVP mode is used, a reference picture index may indicate zero or more virtual reference pictures for inter-prediction. When Merge mode is used, the reference picture index information is copied from one of candidates that are coded in some previously coded CUs (such as a neighboring CU, a generated pair-wise average motion information, a stored entry in a history-based motion buffer, etc.). In one example in VVC, the merge candidate list is constructed by including the following five types of candidates in order: Spatial MVP from spatial neighbour CUs, Temporal MVP from collocated CUs, History-based MVP from an FIFO table, Pairwise average MVP, Zero MVs. In an embodiment, an additional merge mode candidate may be inserted in the list. The additional merge mode is activated only when the current picture has at least one virtual reference picture in the reference picture list. The merge mode may use the pixel data in the collocated block (with zero motion) in the virtual reference picture as inter-prediction data.

In the same embodiment, the order of merge candidates including the new candidate with virtual reference picture may be reordered by any explicit signaling in high-level syntax structure or any implicit derivation from previously coded context information (e.g., hit-ratio of merge candidates).

In another embodiment, the virtual reference picture may be used to perform subblock based motion compensation, such as affine motion compensation. The control point MVs (CPMVs) for affine parameters may be derived from direct signaling without using prediction. The CPMVs may also be derived by referring to some previous coded affine blocks models in part or entirely. For example, the top left CPMV of the current block using virtual reference picture may be signaled or assumed to be zero, and the other CPMV(s) of the block may be derived using the affine model from previously coded affine blocks.

In another embodiment, the virtual reference picture may be used to perform decoded side motion vector derivation techniques, such as DMVR or template matching for MV derivation. In one example, the virtual reference picture may be used as one of the two reference pictures in DMVR mode. In another example, a prediction block from the virtual reference picture may be used as the target block to perform decoder search in DMVR, instead of using the original proposed SAD mechanism in DMVR, which is generated by comparing the two prediction blocks (indicated by the bidirectional motion vector pair) from two reference pictures. In this example, the prediction block from the virtual reference picture may be used to compare with the new pair of predictors from modified MVs in the DMVR search. The pair with minimized SAD when compared with the predictor from the virtual reference picture may be considered as a refinement.

In the same or another embodiment, the sample predictor generated from the virtual reference picture may be used together with the sample predictor(s) by inter or intra prediction methods. In one example, it could be weighted averaged together with an inter or inter predictor for every sample in the final prediction block. In another example, the sample location in the block may be used to determine the weight between virtual reference predictor and the inter or intra predictor(s).

In the same or another embodiment, if it is determined by encoder configuration or implicit decision that the virtual reference picture is generated in region-wise, the virtual reference picture may be partitioned into two or more virtual sub-pictures, so that each virtual subpicture is independently generated through the aforementioned process. The partitioning layout of such virtual subpictures may be signaled in one or more high-level syntax structure (e.g., VPS, SPS, PPS, SEI message). Usually, the width and height of the virtual subpicture may be an integer multiple of tile (if present) or CTU size. FIG. 6B summarize the whole process with virtual subpicture partitioning below.

In the same embodiment, one of reasons that the virtual reference picture is partitioned into multiple virtual reference picture may be the needs of region-wise independent process of neural network inference process to generate the virtual reference, due to the limits of memory or computing power. Another reason is the parallel processing of large sequences like 4K or 8K, with multiple CPUs or GPUs. Another reason is the region-wise independent download or streaming for view-port dependent VR360 streaming or cloud game content streaming.

In the same embodiment, when a coded picture is partitioned into multiple subpictures, a flag in a high-level syntax structure may indicate whether the virtual subpicture layout is identical to the subpicture layout. If aligned, the virtual subpicture layout is not explicitly signaled, but inferred to be equal to the subpicture partitioning layout.

In the same or another embodiment, when the virtual reference picture is partitioned in multiple virtual subpictures and each virtual subpicture is independently generated though the aforementioned process, usually the whole generated virtual reference may have blocking artifact on the boundaries of virtual subpictures. The blocking artifact may degrade the coding performance. To deviate the artifact in the virtual reference picture, any smoothing filter/processing may be applied on the boundaries. The filter coefficient may be signaled in the coded bitstream, pre-trained or pre-defined. When signaled, one or more sets of coefficients may be signaled in a high-level syntax structure and each virtual reference picture or subpicture may select one of them, by signaling an index.

In the same embodiment, the existing deblocking process for the video coding system, such as those of VVC, may be applied to alleviate the blocking artifacts, efficiently. In this case, the boundary strength (BS) values may be set equal to a predefined value (e.g., 1), by default.

In the same embodiment, the BS values of deblocking process are derived from one or more of following values: 1) difference of optical flow between adjacent virtual reference subpictures (large difference of optical flow may indicate strong boundary artifact), 2) BS values or other coding parameters of the collocated block (or CU) in the current picture or other reference picture, 3) edge or feature information of the virtual reference picture generation process or 4) default value when the other options are not available.

In the same or another embodiment, when the subpictures are independently coded and handled as pictures with boundary padding process, the virtual reference picture may be partitioned into multiple virtual reference subpictures with the same partitioning layout as subpictures of the current picture. In this case, any filtering process across virtual subpicture boundaries is disallowed.

In the same or another embodiment, when a virtual reference subpicture is not used for inter-prediction at decoder-side, the virtual reference subpicture is not derived from the aforementioned process. Instead, if exists, it can be filled out with one or more default values.

In the same embodiment or another embodiment, when the generation process is processed in frame-wise, a whole reference picture is generated and may be added into RPL. The generated frame may be stored and handled as a reference picture in decoded picture buffer (DPB), similarly to other decoded reference frames.

In the same or another embodiment, the virtual reference picture may not be outputted and displayed by default. However, any value of internal variable(s), signaled syntax elements(s), algorithm, inference rule or predefined rule may be able to output and display the generated virtual reference picture. It may result in the increment of frame rate in display side, or replace the lost picture for error concealment or stable decoder management in system level.

In the same or another embodiment, the virtual reference picture may be assigned a POC number for different purposes. For the purpose of increasing the frame rate in display side, the POC number may be in between the two existing output pictures. For example, the two existing pictures may be with POC values N and N+2, and the virtual reference picture may be assigned with a POC number equal to N+1 so that it can be displayed in between the two pictures. In another example, the two existing pictures may be with POC values N and N+1, and the virtual reference picture may be assigned with a POC number equal to N+0.5 (non-integer value in this case) so that it can be displayed in between the two pictures. For the purpose of replacing the lost picture for error concealment or stable decoder management, the virtual reference picture may be assigned with a POC number equal to that of the lost picture.

In the same or another embodiment, when the virtual reference picture is outputted, the cropping and bumping out process may be applied to the virtual reference picture, similarly to other decoded reference picture(s). The value(s) of cropping window for the virtual reference picture may be signaled in one or more high-level syntax elements (e.g., parameter set or SEI message). When the cropping window information is not explicitly signaled in the coded bitstream, the predefined default values may be used for cropping or the cropping may not be applied.

In the same or another embodiment, when the virtual reference picture(s) may be used for en-/decoding the current picture, the virtual reference picture(s) may be included in the active reference picture list of the current picture.

In the same or another embodiment, when the virtual reference picture(s) is not used for en-/decoding the current picture, but used for en-/decoding one or more following pictures in decoding order, the virtual reference picture(s) may be included in the inactive reference picture list of the current picture.

In the same or another embodiment, the active or inactive reference picture list(s) may be explicitly signaled in one or more high-level syntax structures (e.g., parameter set, picture header, slice header or SEI message), or may be implicitly derived from other syntax elements/parameters/internal variables with a pre-defined algorithm/rule.

Figure 6A:
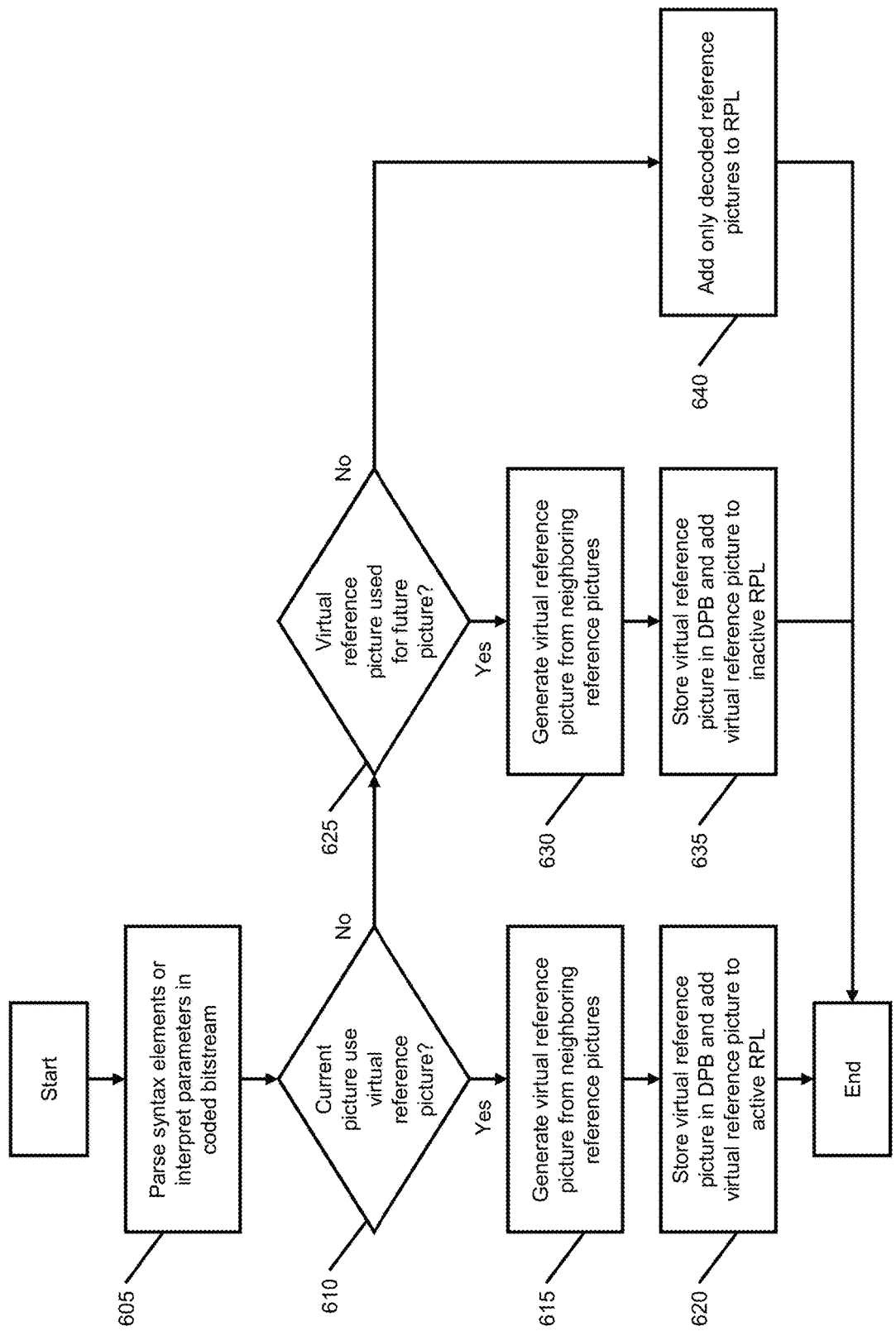
FIG. 6A is a flow diagram of a method of decoding a coded video stream with a virtual reference picture in accordance with an embodiment.
Figure 6B:
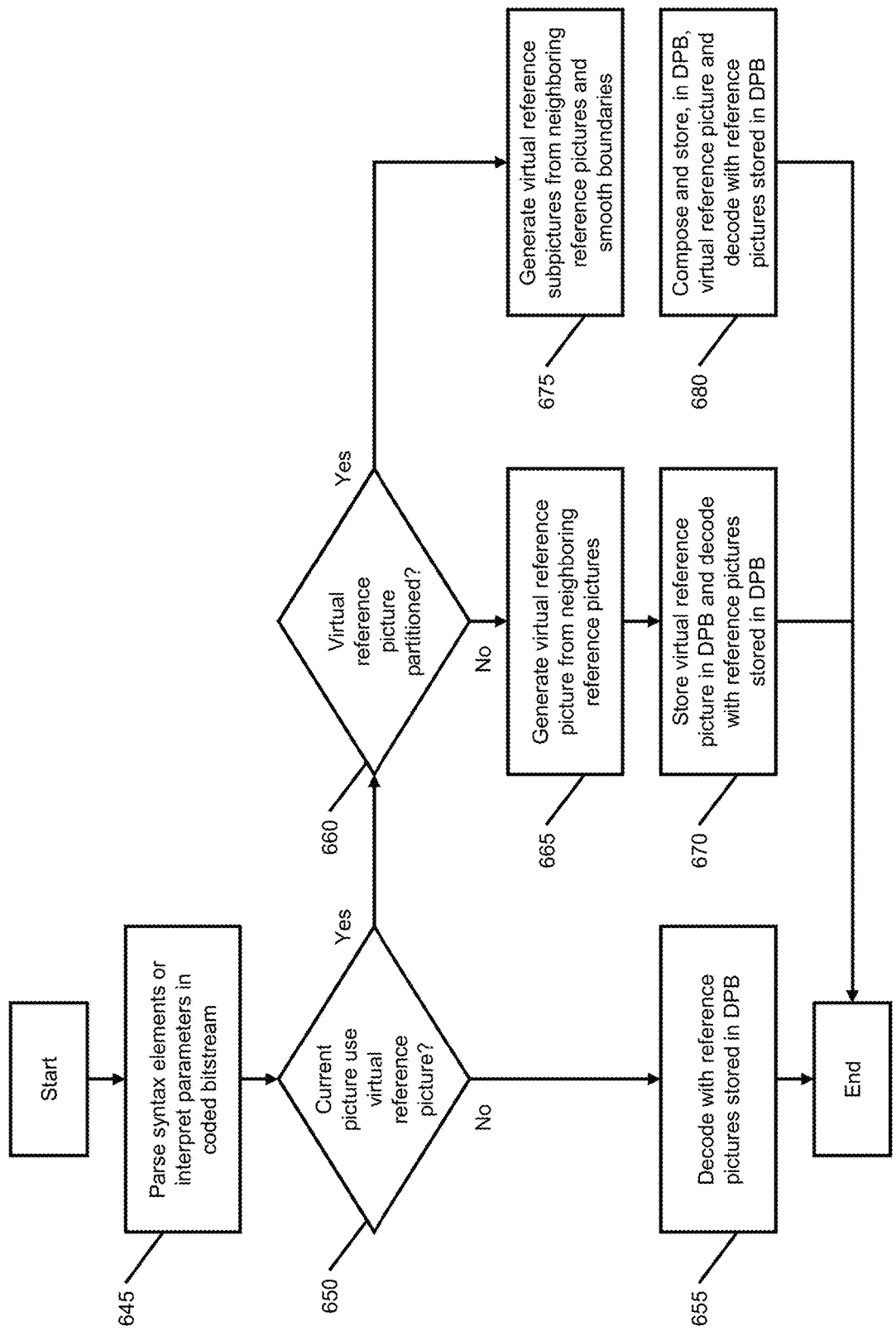
FIG. 6B is a flow diagram of a method of decoding a coded video stream with virtual reference subpictures in accordance with an embodiment.

FIG. 6A is a flow diagram of a method of decoding a coded video stream with a virtual reference picture in accordance with an embodiment.

In the same or another embodiment, FIG. 6A shows a block diagram to generate and manage the virtual reference picture(s) for decoding the current or a future picture. When some syntax elements are parsed or some related parameters are interpreted (operation 605), the decoder may check whether the current picture uses one or more virtual reference picture for inter-prediction or motion compensation (operation 610). If used, the virtual reference picture is generated (operation 615), and inserted into the active reference picture list (operation 620). If not used for the current picture, the decoder may check again whether the virtual reference picture generated for the current picture may be used for the following picture in decoding order (operation 625). If used for any future picture, the virtual reference picture is generated (operation 630) and included into the inactive reference picture list (operation 635). Otherwise, the virtual reference picture is not generated for the current picture (operation 640).

In the same embodiment, when the existing virtual reference picture(s) are no longer used for en-/decoding the current picture, any following picture or other data, the virtual reference picture(s) may not be included in reference picture list(s) and will be removed from the decoded picture buffer.

In the same embodiment, the picture removing time of the virtual reference picture(s) from the decoded picture buffer may be explicitly signaled in high-level syntax structure (parameter set, SEI message) or implicitly derived from other syntax elements/parameters/internal variables.

In the same or another embodiment, the reference picture list including one or more decoded reference picture and one or more virtual reference pictures may be modified so that reference picture with high quality and high hit-ratio can locate at the early position of the list. The optimal order of the reference pictures in the RPL may be determined by pre-encoding, pre-determined algorithm/rule, pre-trained neural network inference processing or any inference rule from neighboring contexts like GoP structure.

In the same embodiment, the high quality may be measured by the QP information used in a picture, such as QP values indicated in picture/slice headers with average. The high hit-ratio may be measured by the block level usage frequency when one reference picture was used in decoding a previous picture. The block level usage may include statistics such as number of blocks referring to this reference picture, number of samples referring to this reference picture, etc.

In the same or another embodiment, when the virtual reference picture is generated, the value of POC of this reference picture may be set equal to that of the current picture.

In the same or another embodiment, when the virtual reference picture is generated, the value of layer ID of this reference picture may be set equal to that of the current picture.

In the same or another embodiment, the virtual reference picture may be marked as "long-term reference" in the RPL, so that POC-based MV scaling does not apply to the virtual reference picture.

In the same or another embodiment, the MV value(s) associated with the virtual reference picture for temporal MV prediction may be set equal to zero, when the virtual reference picture is referred to as reference for deriving temporal motion vector predictor(s).

In the same or another embodiment, a flag or another syntax element may be present in SPS. When the flag or the syntax element is equal to 1, one or more virtual reference pictures may be generated and used for en-/decoding the picture in the coded video sequence that refers to the SPS. When the flag or the syntax element is equal to 0, no virtual reference pictures is generated and used for en-/decoding the picture in the coded video sequence that refers to the SPS.

In the same or another embodiment, a flag or another syntax element may be present in PPS. When the flag or the syntax element is equal to 1, one or more virtual reference pictures may be generated and used for en-/decoding the picture that refers to the PPS. When the flag or the syntax element is equal to 0, no virtual reference pictures is generated and used for en-/decoding the picture that refers to the PPS.

In the same or another embodiment, a flag or another syntax element may be present in APS. When the flag or the syntax element is equal to 1, one or more virtual reference pictures may be generated and used for en-/decoding the slice that refers to the APS. When the flag or the syntax element is equal to 0, no virtual reference pictures may be generated and used for en-/decoding the slice that refers to the APS.

In the same or another embodiment, a flag or another syntax element may be present in picture header. When the flag or the syntax element is equal to 1, one or more virtual reference pictures may be generated and used for en-/decoding the picture associated with the picture header. When the flag or the syntax element is equal to 0, no virtual reference pictures may be generated and used for en-/decoding the picture associated with the picture header.

In the same or another embodiment, a flag or another syntax element may be present in slice header. When the flag or the syntax element is equal to 1, one or more virtual reference pictures may be generated and used for en-/decoding the slice associated with the slice header. When the flag or the syntax element is equal to 0, no virtual reference pictures may be generated and used for en-/decoding the slice associated with the slice header.

In the same or another embodiment, one or more syntax elements in high-level syntax structure indicate which temporal sublayer pictures may use the virtual reference picture for en-/decoding. For example, one or more syntax elements virtual ref use temporal id flag[i], which indicate whether the picture with the i-th temporal sublayer or with temporal ID equal to i use the virtual reference picture for en-/decoding, may be signalled in SPS, PPS, APS or PH.

In the same or another embodiment, any predefined rule or algorithm, which may refer to group of picture structure, other syntax elements, parameters, or internal variables, may determine which temporal sublayer may or may not use the virtual reference picture for en-/decoding. For example, only pictures with highest temporal sublayer may use one or more virtual reference picture for inter-prediction, while other pictures do not use virtual reference picture(s).

In the same or another embodiment, one or more methods, modules, neural network models or techniques for generating the virtual reference picture may be pre-defined or pre-trained. For region, slice, tile, subpicture, picture, temporal sub-layer or group of pictures, the encoder may choose a method/model for generating the virtual reference picture with pre-encoding, rate-distortion based decision or any algorithm. One or more syntax elements signaled in high-level syntax structure may indicate which method/model is used for each region, slice, tile, subpicture, picture, temporal sub-layer or group of pictures.

In the same or another embodiment, all or parts of virtual reference picture generation method/models and their parameters, coefficients, weights or offsets are pre-defined and acknowledged between encoder and decoder, explicitly described in any document, or registered in any list of external standard reference.

In the same or another embodiment, all or parts of virtual reference picture generation method/models and their parameters, coefficients, weights or offsets are explicitly coded in the coded video stream, signaled in any box in file format, or written in any supplementary document, which is attached into the coded stream.

FIG. 6B is a flow diagram of a method of decoding a coded video stream with virtual reference subpictures in accordance with an embodiment.

As shown in FIG. 6B, in operation 645, the decoder 210 parses syntax elements or interprets parameters in a coded bitstream.

In operation 650, the decoder 210 determines whether a current picture uses a virtual reference picture. Based on the current picture being determined to not use the virtual reference picture, the method continues in operation 655. Otherwise, the method continues in operation 660.

In operation 655, the decoder 210 decodes the current picture with reference pictures that are stored in the DPB.

In operation 660, the decoder 210 determines whether the virtual reference picture is partitioned into multiple virtual subpictures. Based on the virtual reference picture being determined to not be partitioned into the multiple virtual subpictures, the method continues in operation 665. Otherwise, the method continues in operation 675.

In operation 665, the decoder 210 generates the virtual reference picture from neighboring reference pictures.

In operation 670, the decoder 210 stores the generated virtual reference picture in the DPB, and decodes the current picture with the reference pictures stored in the DPB.

In operation 675, the decoder 210 generates virtual reference subpictures from neighboring reference pictures, and smooths boundaries of the generated virtual reference subpictures.

In operation 680, the decoder 210 composes the virtual reference picture based on the virtual reference subpictures of which the boundaries are smoothed, stores the composed virtual reference picture in the DPB, and decodes the current picture with the reference pictures stored in the DPB.

Figure 7:
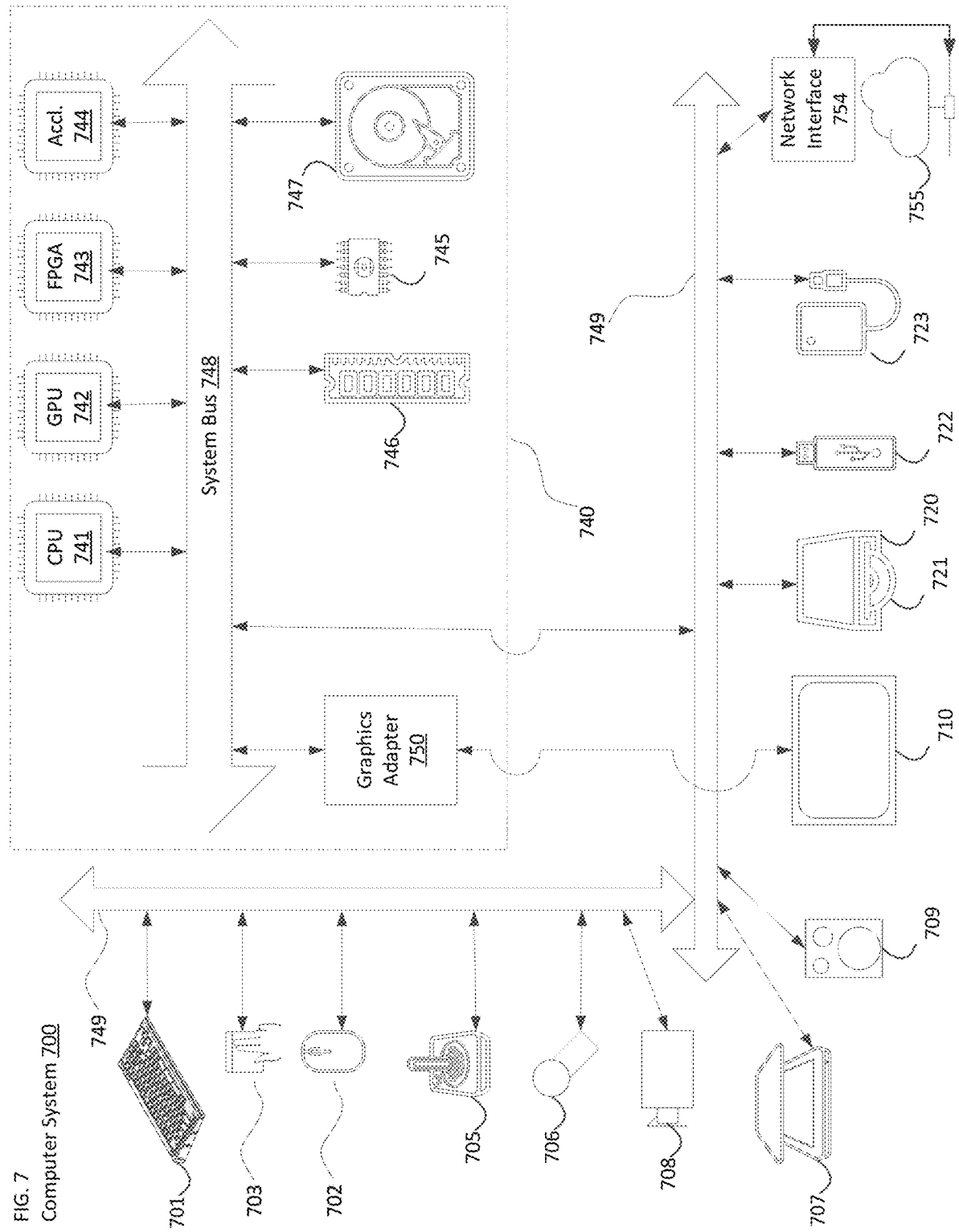
FIG. 7 is a schematic illustration of a computer system in accordance with an embodiment.

FIG. 7 is a schematic illustration of a computer system 700 in accordance with an embodiment.

The techniques for inter-prediction with virtual reference picture described above, can be implemented as computer software using computer-readable instructions and physically stored in one or more computer-readable media. For example, FIG. 7 shows the computer system 700 suitable for implementing embodiments of the disclosed subject matter.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are examples in nature and are not intended to suggest any limitation as to the scope of use or functionality of the computer software implementing embodiments of the disclosure. Neither may the configuration of components be interpreted as having any dependency or requirement relating to any one or combination of components illustrated in the embodiment of a computer system 700.

Computer system 700 may include human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove 704, joystick 705, microphone 706, scanner 707, camera 708.

Computer system 700 may also include human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove 704, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through, e.g., stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art may also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Networks may require external network interface adapters that attached to general purpose data ports or peripheral buses (749) (such as, for example USB ports of the computer system 700; others may be integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to CANbus devices), or bi-directional, for example to other computer systems using local or wide area digital networks. Protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those designed and constructed for the purposes of the disclosure, or they can be of the kind well known and available to those having skill in the computer software arts.

As an example and not by way of limitation, the computer system having architecture 700 and the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as storage of the core 740 that are of non-transitory nature, such as core-internal mass storage 747 or ROM 745. The software implementing various embodiments of the disclosure can be stored in such devices and executed by core 740. A computer-readable medium can include one or more memory devices or chips. The software can cause the core 740 and the processors therein (including CPU, GPU, FPGA, and the like) to execute processes or parts of processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute processes or parts of processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The disclosure encompasses any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of performing inter-picture prediction of a current picture of a video sequence, the method being performed by at least one processor, and the method comprising:

determining whether the current picture uses a virtual reference picture;

based on the current picture being determined to use the virtual reference picture:

generating, for the current picture, the virtual reference picture from neighboring reference pictures that are nearest neighbors to the virtual reference picture, wherein the generating comprises:

generating a coarse intermediate frame based on offset compensation and blending of weighted features; and generating the virtual reference picture based on spatially compensating and re-blending one or more shallow edges of the coarse intermediate frame in a frame-wise or block-wise manner based on an indicator, wherein the indicator indicates whether the virtual reference picture is generated frame-wise or block-wise;

storing the generated virtual reference picture in a decoded picture buffer; and adding the generated virtual reference picture to an active reference picture list; and performing the inter-picture prediction of the current picture, based on the active reference picture list to which the virtual reference picture is added.

2. The method of claim 1, further comprising, based on the current picture being determined to not use the virtual reference picture, determining whether the virtual reference picture that is generated for the current picture is used for a future picture.

3. The method of claim 2, further comprising, based on the virtual reference picture being determined to be used for the future picture:

generating, for the future picture, the virtual reference picture from the neighboring reference pictures;

storing the generated virtual reference picture in the decoded picture buffer; and adding the generated virtual reference picture to an inactive reference picture list.

4. The method of claim 2, further comprising, based on the virtual reference picture being determined to not be used for the future picture, adding only one or more decoded reference pictures into the active reference picture list.

5. The method of claim 1, further comprising, based on the current picture being determined to not use the virtual reference picture, decoding the current picture with one or more decoded reference pictures that are stored in the decoded picture buffer.

6. The method of claim 1, further comprising, based on the current picture being determined to use the virtual reference picture, determining whether the virtual reference picture that is generated for the current picture is partitioned into multiple virtual subpictures.

7. The method of claim 6, further comprising, based on the virtual reference picture being determined to not be partitioned into the multiple virtual subpictures:

generating, for the current picture, the virtual reference picture from the neighboring reference pictures;

storing the generated virtual reference picture in the decoded picture buffer; and decoding the current picture with one or more decoded reference pictures that are stored in the decoded picture buffer.

8. The method of claim 6, further comprising, based on the virtual reference picture being determined to be partitioned into the multiple virtual subpictures:

generating, for the current picture, virtual reference subpictures from the neighboring reference pictures;

smoothing boundaries of the generated virtual reference subpictures;

composing the virtual reference picture based on the virtual reference subpictures of which the boundaries are smoothed;

storing the composed virtual reference picture in the decoded picture buffer; and decoding the current picture with one or more decoded reference pictures that are stored in the decoded picture buffer.

9. The method of claim 1, wherein the generating, for the current picture, the virtual reference picture comprises:

estimating an optical flow in the neighboring reference pictures;

compensating the estimated optical flow in the neighboring reference pictures; and enhancing details in the neighboring reference pictures in which the optical flow is compensated, to generate the virtual reference picture.

10. An apparatus for performing inter-picture prediction of a current picture of a video sequence, the apparatus comprising:

at least one memory configured to store computer program code; and at least one processor configured to access the at least one memory and operate according to the computer program code, the computer program code comprising:

first determining code configured to cause the at least one processor to determining whether the current picture uses a virtual reference picture;

generating code configured to cause the at least one processor to, based on the current picture being determined to use the virtual reference picture, generate, for the current picture, the virtual reference picture from neighboring reference pictures that are nearest neighbors to the virtual reference picture, wherein the generating comprises:

generating a coarse intermediate frame based on offset compensation and blending of weighted features; and generating the virtual reference picture based on spatially compensating and re-blending one or more shallow edges of the coarse intermediate frame in a frame-wise or block-wise manner based on an indicator, wherein the indicator indicates whether the virtual reference picture is generated frame-wise or block-wise;

storing code configured to cause the at least one processor to store the generated virtual reference picture in a decoded picture buffer;

adding code configured to cause the at least one processor to add the generated virtual reference picture to an active reference picture list; and performing code configured to cause the at least one processor to perform the inter-picture prediction of the current picture, based on the active reference picture list to which the virtual reference picture is added.

11. The apparatus of claim 10, further comprising second determining code configured to cause the at least one processor to, based on the current picture being determined to not use the virtual reference picture, determine whether the virtual reference picture that is generated for the current picture is used for a future picture.

12. The apparatus of claim 11, wherein the generating code is further configured to cause the at least one processor to, based on the virtual reference picture being determined to be used for the future picture, generate, for the future picture, the virtual reference picture from the neighboring reference pictures, the storing code is further configured to cause the at least one processor to store the generated virtual reference picture in the decoded picture buffer, and
the adding code is further configured to cause the at least one processor to add the generated virtual reference picture to an inactive reference picture list.

13. The apparatus of claim 11, wherein the adding code is further configured to cause the at least one processor to, based on the virtual reference picture being determined to not be used for the future picture, add only one or more decoded reference pictures into the active reference picture list.

14. The apparatus of claim 10, further comprising decoding code configured to cause the at least one processor to, based on the current picture being determined to not use the virtual reference picture, decode the current picture with one or more decoded reference pictures that are stored in the decoded picture buffer.

15. The apparatus of claim 10, further comprising second determining code configured to cause the at least one processor to, based on the current picture being determined to use the virtual reference picture, determine whether the virtual reference picture that is generated for the current picture is partitioned into multiple virtual subpictures.

16. The apparatus of claim 15, wherein the generating code is further configured to cause the at least one processor to, based on the virtual reference picture being determined to not be partitioned into the multiple virtual subpictures, generate, for the current picture, the virtual reference picture from the neighboring reference pictures, the storing code is further configured to cause the at least one processor to store the generated virtual reference picture in the decoded picture buffer, and
the computer program code further comprises decoding code configured to cause the at least one processor to decode the current picture with one or more decoded reference pictures that are stored in the decoded picture buffer.

17. The apparatus of claim 15, wherein the generating code is further configured to cause the at least one processor to, based on the virtual reference picture being determined to be partitioned into the multiple virtual subpictures, generate, for the current picture, virtual reference subpictures from the neighboring reference pictures, the computer program code further comprises:
smoothing code configured to cause the at least one processor to smooth boundaries of the generated virtual reference subpictures; and
composing code configured to cause the at least one processor to compose the virtual reference picture based on the virtual reference subpictures of which the boundaries are smoothed,
the storing code is further configured to cause the at least one processor to store the composed virtual reference picture in the decoded picture buffer, and
the computer program code further comprises decoding code configured to cause the at least one processor to decode the current picture with one or more decoded reference pictures that are stored in the decoded picture buffer.

18. The apparatus of claim 10, wherein the generating code is further configured to cause the at least one processor to:

estimate an optical flow in the neighboring reference pictures;
compensate the estimated optical flow in the neighboring reference pictures; and
enhance details in the neighboring reference pictures in which the optical flow is compensated, to generate the virtual reference picture.

19. A non-transitory computer-readable storage medium storing instructions that, when executed by at least one processor for performing inter-picture prediction of a current picture of a video sequence, cause the at least one processor to:

determine whether the current picture uses a virtual reference picture;
based on the current picture being determined to use the virtual reference picture:
generate, for the current picture, the virtual reference picture from neighboring reference pictures that are nearest neighbors to the virtual reference picture, wherein the generating comprises:
generating a coarse intermediate frame based on offset compensation and blending of weighted features; and
generating the virtual reference picture based on spatially compensating and re-blending one or more shallow edges of the coarse intermediate frame in a frame-wise or block-wise manner based on an indicator, wherein the indicator indicates whether the virtual reference picture is generated frame-wise or block-wise;
store the generated virtual reference picture in a decoded picture buffer; and
add the generated virtual reference picture to an active reference picture list; and
perform the inter-picture prediction of the current picture, based on the active reference picture list to which the virtual reference picture is added.

20. The non-transitory computer-readable storage medium of claim 19, wherein the instructions, when executed by the at least one processor, further cause the at least one processor to, based on the current picture being determined to not use the virtual reference picture, determine whether the virtual reference picture that is generated for the current picture is used for a future picture.

\* \* \* \* \*